Figure 1:
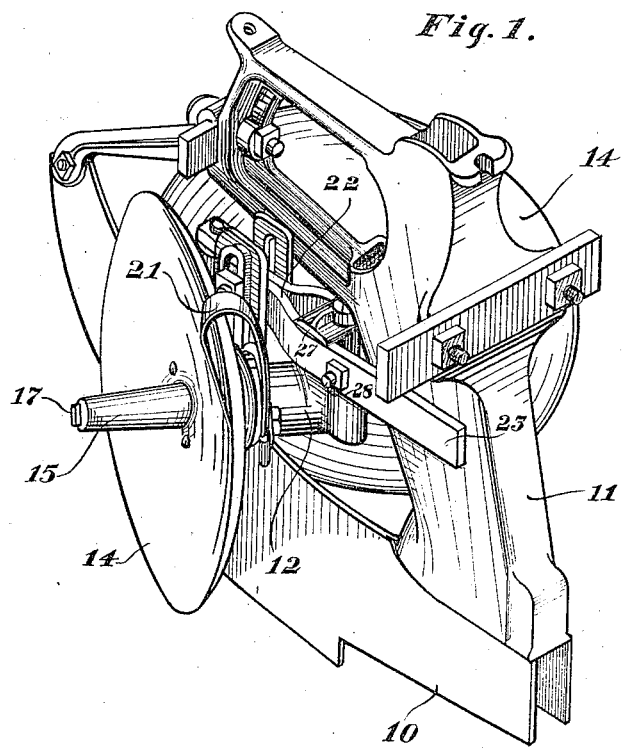

W. S. GRAHAM.
DISK FURROW OPENER.
APPLICATION FILED APR. 15, 1909.

1,002,207.

Patented Aug. 29, 1911.

2 SHEETS—SHEET 1.

WITNESSES

INVENTOR
William S. Graham

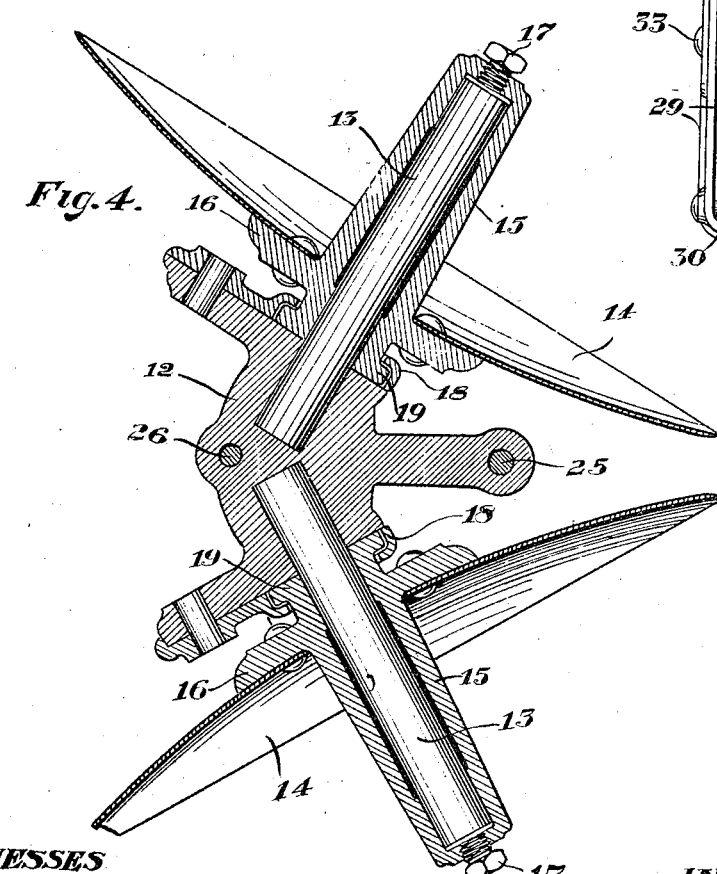

UNITED STATES PATENT OFFICE.

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

DISK FURROW-OPENER 1,002,207. Specification of Letters Patent. Patented Aug. 29, 1911.

Application filed April 15, 1909. Serial No. 490,027.

*To all whom it may concern:*

Be it known that I, WILLIAM S. GRAHAM, a citizen of the United States, residing at Canton, in the county of Fulton, State of Illinois, have invented certain new and useful Improvements in Disk Furrow-Openers, of which the following is a specification, reference being had to the accompanying drawings.

My invention relates to disk furrow openers adapted to be used on corn planters, and has for its object to provide a construction which shall be applicable to various makes of corn planter, by which construction, when the device is applied to a planter, the disks shall be held firmly in position in any of a plurality of adjustments.

A further object of my invention is to provide a construction in which the bearings for the disk may be properly lubricated and protected against dirt and consequently against excessive wear, with the result also that the addition of the device as a whole to the planter does not unduly increase the draft upon the horses.

A further object is to improve generally the construction and arrangement of devices of this character.

I accomplish these objects by the means shown in the drawings and hereinafter specifically described.

What I believe to be new will be pointed out in the claims.

Figure 2:
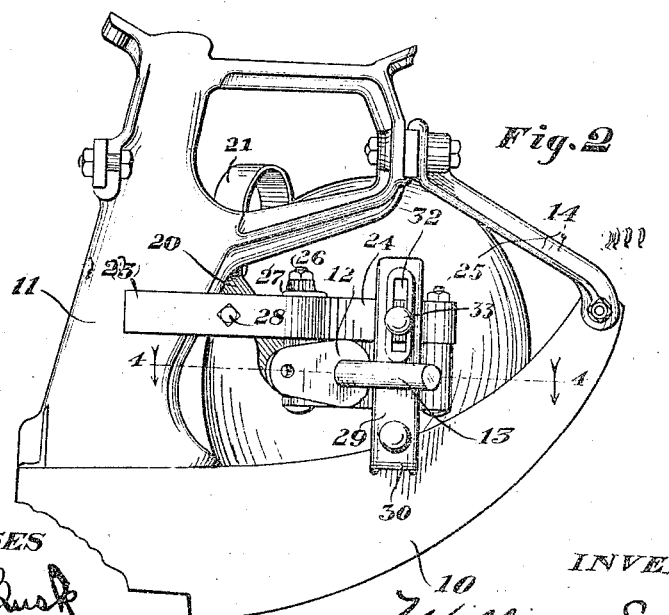

In the drawings:—Figure 1 is a perspective rear and side view of an ordinary runner of a corn-planter, with my improved device applied thereto. Fig. 2 is a perspective view from the opposite side of the same device, with one of the disks removed. Fig. 3 is a top or plan view of my complete device. Fig. 4 is an enlarged sectional view taken at line 4—4 of Fig. 2. Fig. 5 is an enlarged detail, being a perspective view of the part that retains the disk on its spindle, showing also the scraper attached thereto. Fig. 6 is an enlarged detail, partly in section, being a view of the parts for clamping the device to the runner shoe.

Referring to the drawings:—10 indicates the shoe and 11 the seed-tube of the ordinary runner of a corn-planter, to which my improved device is attached.

Referring especially to Figs. 3 and 4, 12 indicates a block, secured to which are two spindles 13, which, in the construction shown, enter sockets in said block and are rigidly secured therein. 14 indicates disks which are secured upon the spindles 13 in the manner now to be described. Each disk 14 is secured by rivets or otherwise to a hub member 15. Each of these hub members is in the form of a cylindrical tube provided with an annular flange 16 near its inner end to which the disk is secured, and closed at its outer end except for a small opening into which is screw-threaded a plug 17. At their ends, these hubs are of a size to have a good working fit upon the spindles, the remainder of their length being of a larger size in order to receive and hold lubricant, which is inserted through the openings in the outer ends of the hubs. The hubs 15 are retained in position on the spindle by means of semi-circular rings 18 which fit down over flanges 19 formed on the inner ends of the hubs, the rings or guards 18 being bolted or otherwise secured to the block 12. By this means the bearings are adapted to be kept clean and well lubricated, the plug 17 preventing dirt from getting into the bearings of the hub on the spindle, and the rings or guards 18 being kept free of dirt by reason of embracing only the upper portions of the flanges 19. Projecting upwardly and rearwardly from each ring or guard 18 is an arm 20 upon the upper end of which is bolted a scraper 21 which extends up over the adjacent disk so as to be effective to clean the outer side of the disk.

The device as a whole is held in position relative to the runner by the means now to be described.

22 indicates a fork, which, in the construction shown, is formed by bending a heavy strap of ductile metal, said fork comprising arms 23 and head 24. This fork is fixedly attached to the block 12 by means of a bolt 25 passing through vertical openings in the forward ends of the block 12 and the head 24, and by means of a bolt 26 passing through a vertical opening in the rear of the block 12 and through a plate 27 located on the upper edges of the diverging arms 23. By the means thus far described, the disks are held very securely relative to the fork 22.

The rear end of the fork 22 is adapted to embrace the seed-tube 11 to which it is very securely clamped by means of a bolt 28 which passes through the two arms 23. It will be readily understood that such clamping is attainable on seed-tubes of different sizes, and also that the fork may be secured in place adjusted more or less forward and back and adjusted more or less up and down as desired.

The forward end of the fork 22 is supported by means of standards 29. As seen in Fig. 6, each of these standards is provided with a jaw portion 30 at its lower end, adjacent to which jaw portions the standards are provided with holes through which a bolt 31 is passed so as to clamp the standards firmly upon the shoe 10 of the ordinary runner of a corn-planter. At their upper ends, these standards are provided with longitudinal slots 32, through which slots, and through a hole through the head 24 of the fork 22, is passed a bolt 33. By this means the head 24,—and consequently the disks 14,—are adapted to be held at any desired adjusted vertical position. It will be understood that to readjust the depth at which the disks run it is only necessary to loosen the bolts 28 and 33, whereupon the parts may be adjusted as desired, within the limits of the slots 32.

By my construction I provide means for securing the disks very rigidly in position, as well as means for quickly and readily adjusting their position. I provide a new and improved mounting for the disks by which the bearings may be kept free of dirt and properly lubricated, and I provide new and improved means for securing the disks in position on the spindles.

What I claim as my invention and desire to secure by Letters Patent is:—

1. In a disk furrow opener, the combination with a supporting block, a spindle fixedly secured thereto, and a disk revolubly mounted on said spindle, of a fork formed by bending upon itself a strap of ductile metal, a bolt passing through openings in the two arms of said fork and adapted to clamp the fork upon the seed-tube of a corn-planter, a bolt passing through vertical openings in the forward ends of said block and said fork-head, a plate located on the upper edges of the diverging arms of said fork, a bolt passing through openings in said plate and the back portion of said block, and adjustable means for supporting the forward end of said fork-head.

2. In a disk furrow opener, the combination with a supporting block, a spindle fixedly secured thereto, and a disk revolubly mounted on said spindle, of a pair of standards adapted to embrace at their lower ends the shoe of a corn-planter, a bolt passing through said standards and adapted to clamp them upon said shoe, registering vertical slots in said standards, a fork formed by bending upon itself a strap of ductile metal, the head of said fork extending between said standards, a bolt passing through openings in the two arms of said fork and adapted to clamp the same upon the seed-tube of the corn-planter, a bolt passing through the slots in said standards and through the head of said fork for clamping said fork at different heights between said standards, and means for rigidly securing said supporting block to said fork.

3. In a disk furrow opener, the combination with a supporting-block, a spindle fixedly secured thereto, and a disk revolubly mounted on said spindle, of a fork formed of a single strip of metal bent to form two arms adapted to be clamped upon the seed-tube of a corn-planter and to form a vertical eye at its forward end, a bolt passing through said vertical eye and through said supporting-block and rigidly securing said supporting-block to said fork, and means for supporting the forward end of said fork.

4. In a disk furrow opener, the combination of a supporting block comprising a forwardly-extending lug and two rearwardly-extending lugs, a spindle fixedly secured in said supporting block at each side thereof, a disk revolubly mounted on each of said spindles, each of said disks being provided with an annular groove in the inner end of its hub, means secured to said rearwardly-extending lugs and engaging said annular grooves for holding said disks in position on said spindles against said supporting block, a fork adapted to embrace and to be clamped upon the seed-tube of a corn-planter, means for securing said fork firmly to said supporting-block, and a pair of standards adapted to embrace at their lower ends the shoe of the corn-planter and to be clamped firmly thereon and adapted to also embrace between them and to be clamped upon the head of said fork and said forwardly-extending lug.

WILLIAM S. GRAHAM.

Witnesses:
E. H. BEALL,
WM. M. ROBINSON.